US005601273A

United States Patent [19]

Avganim

[11] Patent Number: 5,601,273

[45] Date of Patent: Feb. 11, 1997

[54] LOCKING DEVICE FOR ARRESTING A PORTABLE OBJECT TO A STATIONARY OBJECT

[76] Inventor: Meir Avganim, 156 Moshav, Gealiya, Israel

[21] Appl. No.: 515,814

[22] Filed: Aug. 16, 1995

[30] Foreign Application Priority Data

Aug. 19, 1994 [IL] Israel ........................................ 110720

[51] Int. Cl.[6] .................................................... F16M 13/00

[52] U.S. Cl. ............................................................ 248/551

[58] Field of Search .................................... 248/551, 552, 248/553; 70/58, 67, 68

[56] References Cited

U.S. PATENT DOCUMENTS

| | | | |
|---|---|---|---|
| 3,967,476 | 7/1976 | Look | 70/58 |
| 4,022,036 | 5/1977 | Cebuhar | 70/58 |
| 4,493,267 | 1/1985 | Jedziniak | 108/50 |
| 4,691,891 | 9/1987 | Dionne | 248/551 |
| 5,050,836 | 9/1991 | Makous | 248/553 |
| 5,052,651 | 10/1991 | Guddee | 70/58 X |
| 5,076,079 | 12/1991 | Monoson et al. | 70/58 |
| 5,228,658 | 7/1993 | Kelley | 248/551 |

FOREIGN PATENT DOCUMENTS

| | | | |
|---|---|---|---|
| 0105675 | 4/1984 | European Pat. Off. | B64C 1/22 |
| 2400124 | 7/1975 | Germany | E05B 73/00 |
| 8400972 | 4/1985 | Sweden . | |
| 2153902 | 8/1985 | United Kingdom | E05B 73/00 |
| 9413913 | 6/1994 | WIPO | E05B 73/00 |

*Primary Examiner*—Ramon O. Ramirez
*Attorney, Agent, or Firm*—Ostrolenk, Faber, Gerb & Soffen, LLP

[57] ABSTRACT

An anti-theft device for arresting portable objects such as TV or VCR sets to a stationary base. The device comprises a first elongated block member formed with a recess extending therealong, the recess having a series of undercut profiled portions and a series of non-undercut portions, arranged in staggered relationship. A second, complementary, elongated block member is used, formed with a projecting rib extending therealong, the rib having a series of portions slidably fitting the said undercut portions, and a series of portions freely insertable into the said undercut portions of the first member, arranged in the same staggered relationship. Locking means are provided for interlocking the members to each other after being engaged by matching the said portions and bringing the members into an overlapping position.

14 Claims, 11 Drawing Sheets

20
24a
10
12a
22a
14a
22
IV
II
III
V
12
34a
16'a
14b
16'
16"
22b
24b
12b
34b
30
32
12c
22c

LOCKING DEVICE FOR ARRESTING A PORTABLE OBJECT TO A STATIONARY OBJECT

BACKGROUND OF THE INVENTION

The present invention generally relates to locking devices and more particularly to an arrangement for safely connecting to each other a pair of objects so as to avoid the disconnection thereof.

These kinds of arrangements are useful as safety precaution against thefts of the portable objects such as television sets, computers and other valuable pieces of furniture or instruments in case of burglary.

Known devices for the purposes in question usually comprise male and female profiled matching rails, such as of dove-tail cross-section equipped with suitable key locking mechanisms (see for example Swedish Patent No. 8400972-9).

The use of these arrangements is, however, quite cumbersome and inconvenient, mainly for the reason that it calls for most accurate preparation (affixing of the rails onto the respective locations), and that the actual engagement involves careful maneuvering of the sometimes quite heavy portable object (e.g. a TV set) until completing the sliding interlocked engagement.

It is therefore an object of the present invention to provide a more simple, quick and easy to handle interlocking arrangement.

SUMMARY OF THE INVENTION

Thus provided according to the invention is a locking device for arresting a portable object such as a TV Set, VCR or attache case to a stationary object. The device comprises a first elongated block member formed with a recess extending therealong, the recess having a series of undercut profiled portions and a series of non-undercut portions, arranged in staggered relationship. A second, complementary, elongated block member is used, formed with a projecting rib extending therealong, the rib having a series of portions slidably fitting the said undercut portions, and a series of portions freely insertable into the said undercut portions of the first member, arranged in the same staggered relationship. Locking means are provided for interlocking the members to each other after being engaged by matching the said portions and bringing the members into an overlapping position.

The undercut portions are preferably of a circular profile.

According to another aspect of the invention the locking device may be associated with steel cable or the like by which an additional portable object can be safely secured by one and the same locking device.

BRIEF DESCRIPTION OF THE DRAWINGS

These and further constructional details and advantages of the invention will become more clearly understood in the light of the ensuing description of a preferred embodiment thereof, given by way of example only with reference to the accompanying drawings, wherein.

DETAILED DESCRIPTION OF THE PREFERRED EMBODIMENTS

Figures 1A, 1B, 2, 3, 4, 5:
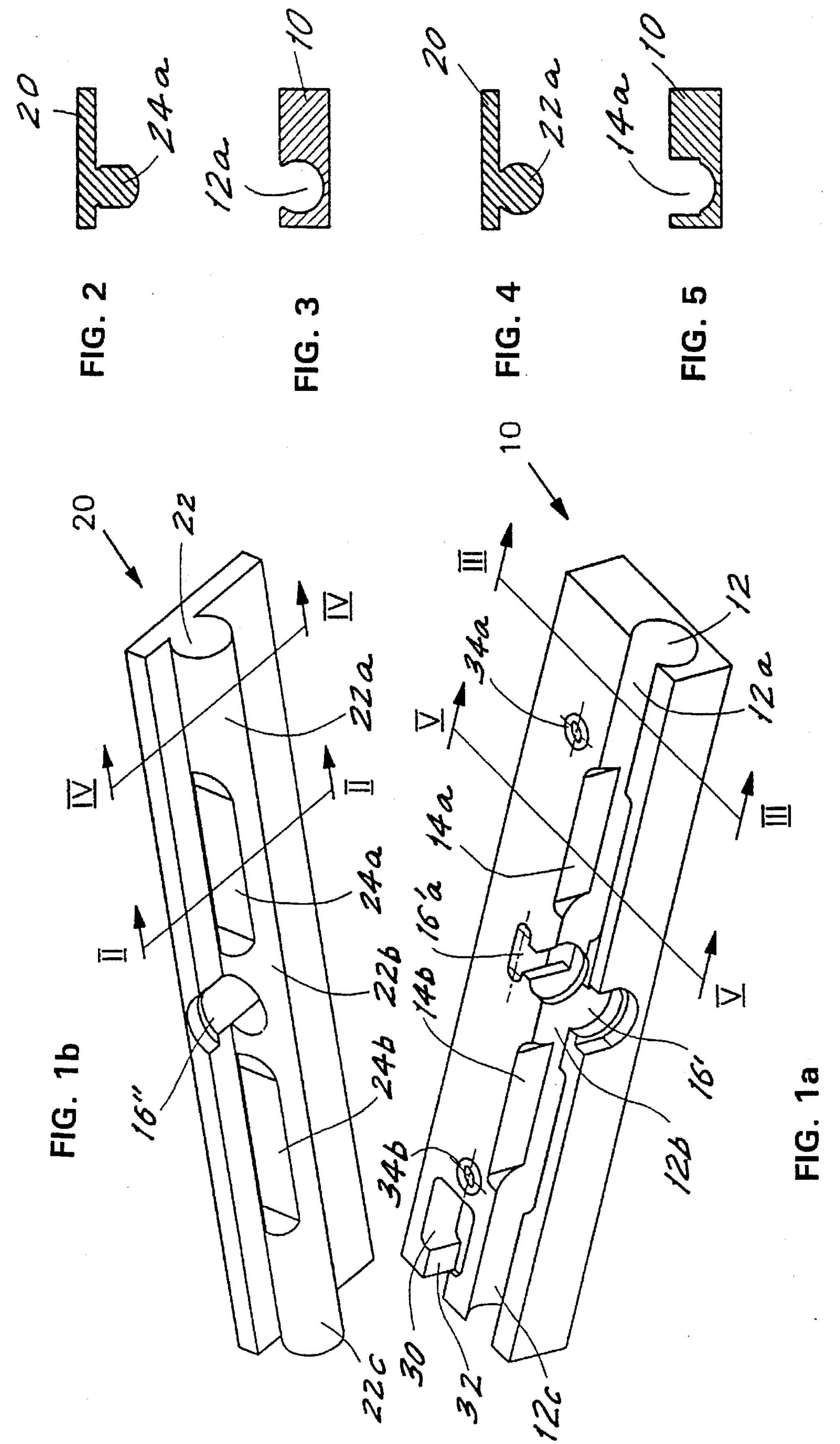
FIG. 1A is a three-dimensional view of the bottom member of the locking device.
FIG. 1B is a three-dimensional view of the mating, upper locking member.
FIG. 2 a cross-section taken along line II—II of FIG. 1*b;*
FIG. 3 is a cross-section taken long line III—III of FIG. 1*a;*
FIG. 4 is across-section taken along line IV—IV of FIG. 1*b;*
FIG. 5 is a cross-section taken along line V—V of FIG. 1*a;*

Referring now to FIGS. 1*a* and 1*b* there is shown the first, bottom or female locking member denoted 10 being of generally elongated block shape of a rectangular cross-section. All along the block 10 there is formed a recess 12 having an undercut cross-section, in the illustrated example being of a more than half a circular cross-section. However, other undercut profiles may be used such as square, polygonal or dove-tail.

As further seen, the undercut recess 12 is interfered at two locations, namely by open-top portions 14*a* and 14*b* whereby the overhanging circular portions (above the horizontal diameter thereof) is cut away to form a U-shaped cross-section as shown in FIG. 5. There are thus formed three distanced undercut sub-portions namely 12*a*, 12*b* and 12*c*, separated by the two relieved, non-undercut portions 14*a* and 14*b*.

As further shown there is provided a bore 16' with an enlarged portion 16'a for receiving a key-operated device for locking the pair of locking members together as will be explained further below.

Turning now to the upper, male block shaped locking member designated 20, it comprises a bulged rib 22 of a complementary cross-section (FIG. 4) namely slidingly fitting into the recess 12. The circular contour of the rib 22 is interfered by cut-away portions 24a and 24*b* (see FIG. 2). The distances and arrangement of the upper member 20 conforms that of the bottom member 10, namely that three male portions 22*a*, 22*b* and 22*c* are present with two relieved portions 24*a* and 24*b*.

The member 20 is also provided with a complementary bore designated 16" which, together with the bore 16' of the member 10, defines a cavity for a key operated locking device of any known design.

It will be noted that the far end side of the member 10 is provided with an additional cavity 30 extended by an open-sided recess 32, which is used if a cable security arrangement is to be employed.

Finally, a pair of bores 34*a* and 34*b* are formed for passing of screws by which the bottom locking member 10 can be mounted to the stationary object (not shown).

Figures 6A, 6B:
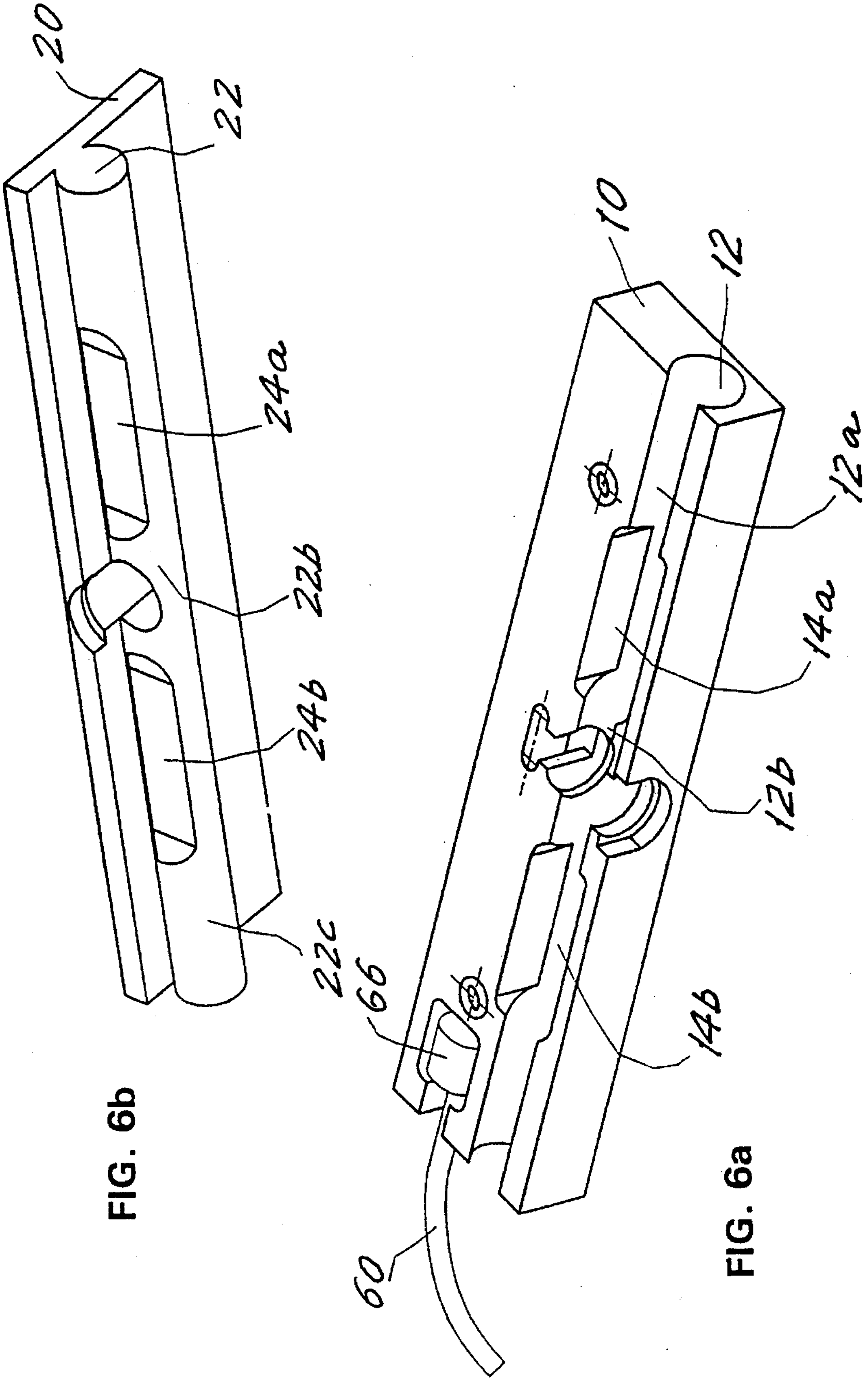
FIGS. 6A and 6B show the bottom and top locking device members in position suitable for insertion and engagement to each other, as well as illustrate a provision for use of a security cable.

FIGS. 6*a* and 6*b* illustrate the manner of interlocking of the members 10 and 20 to each other. This is conveniently achieved by inserting the male portion 22*c* from above into the cavity portion 14*b*, the relieved portion 24*b* into the undercut portion 12*b*, the portion 22*b* into the cavity portion 14*a*, and the relieved portion 24*a* into the undercut portion 12*a*. After such interconnection, the member 20 can slide into complete overlapping along a short distance only—which is considered as the main advantage relative to the situation where the members have to be engaged by sliding the upper member all along the bottom member which would have been the case but for the interchanging relieved and undercut arrangement of portions as described above.

The use of the locking device for securing a TV set to its table or other support, as well as simultaneously securing a VCR set, will be now exemplified.

Figure 7B:
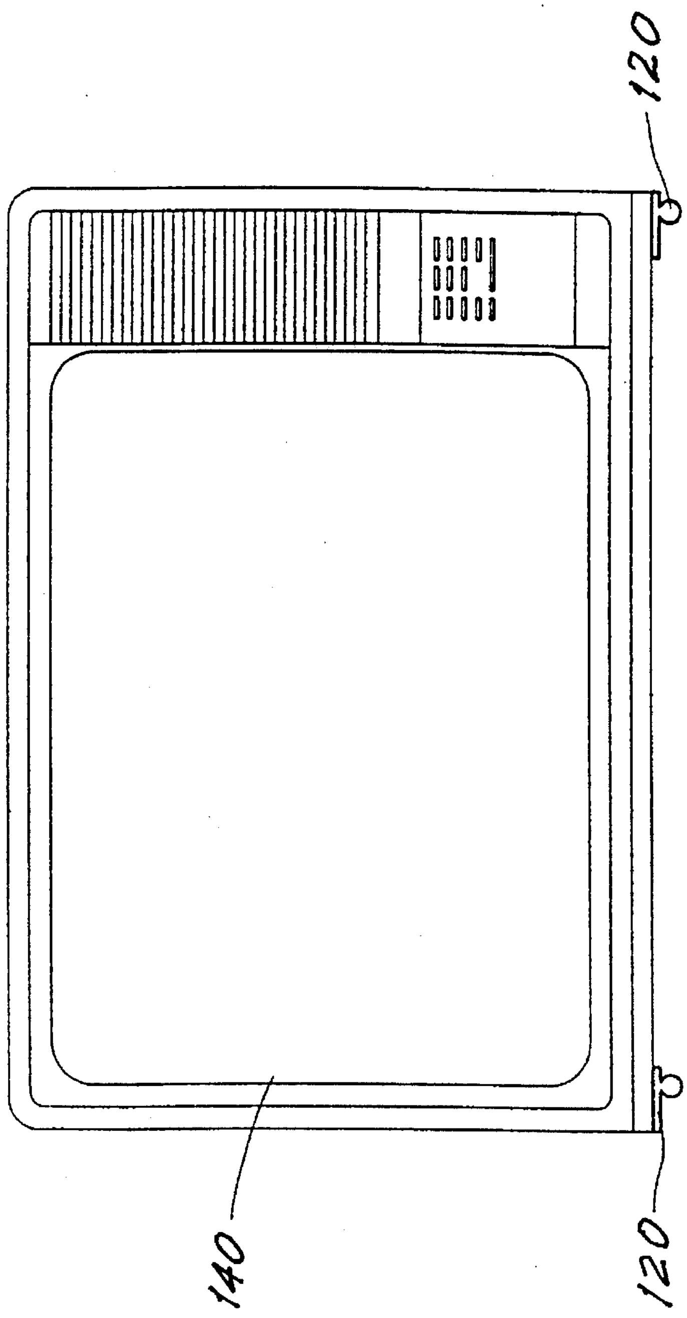
FIGS. 7A–7G illustrate the application of the locking device for the securement of a TV set and a VCR set.
Figure 7A:
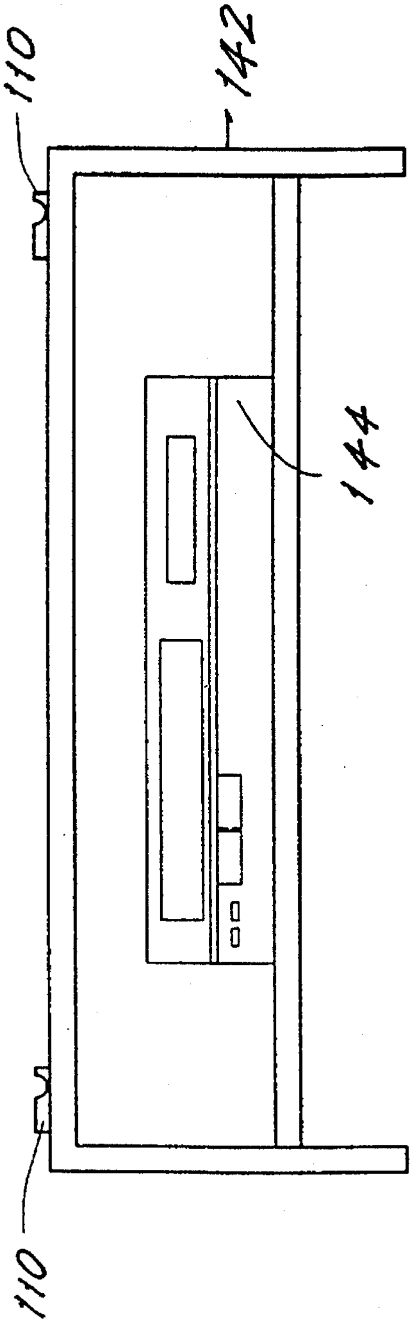
Figure 7D:
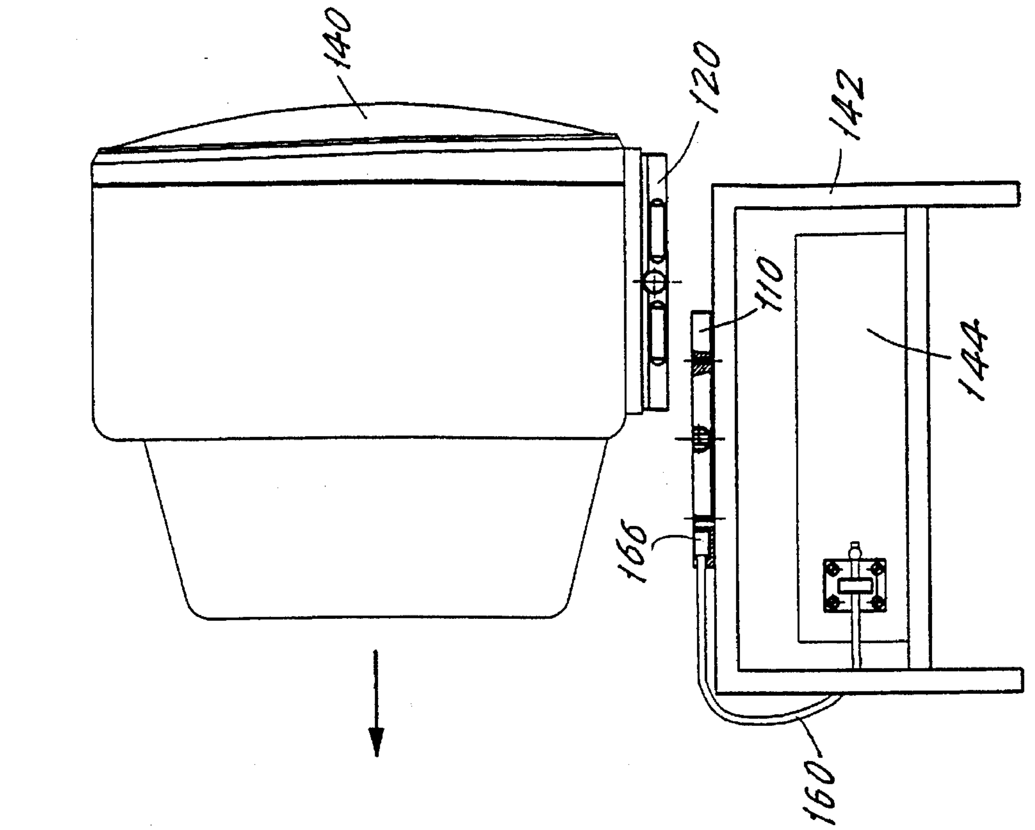
Figure 7C:
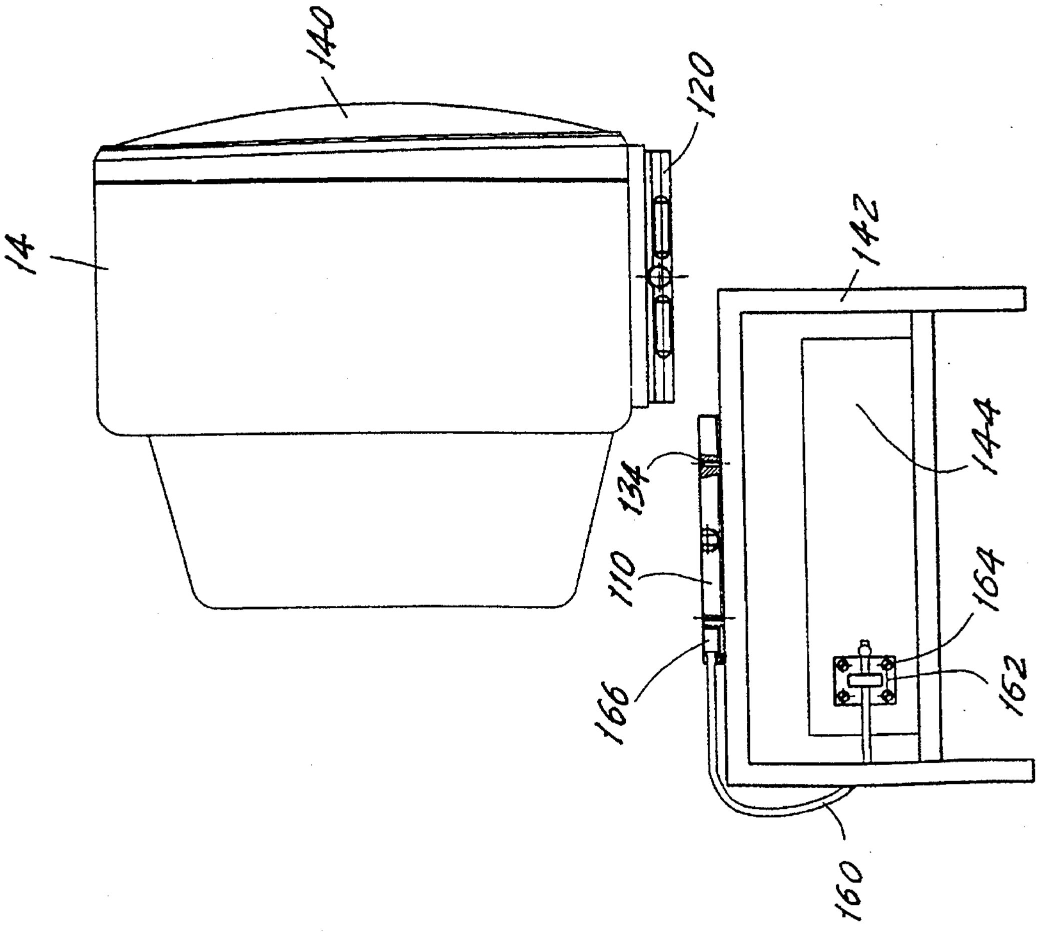
Figure 7F:
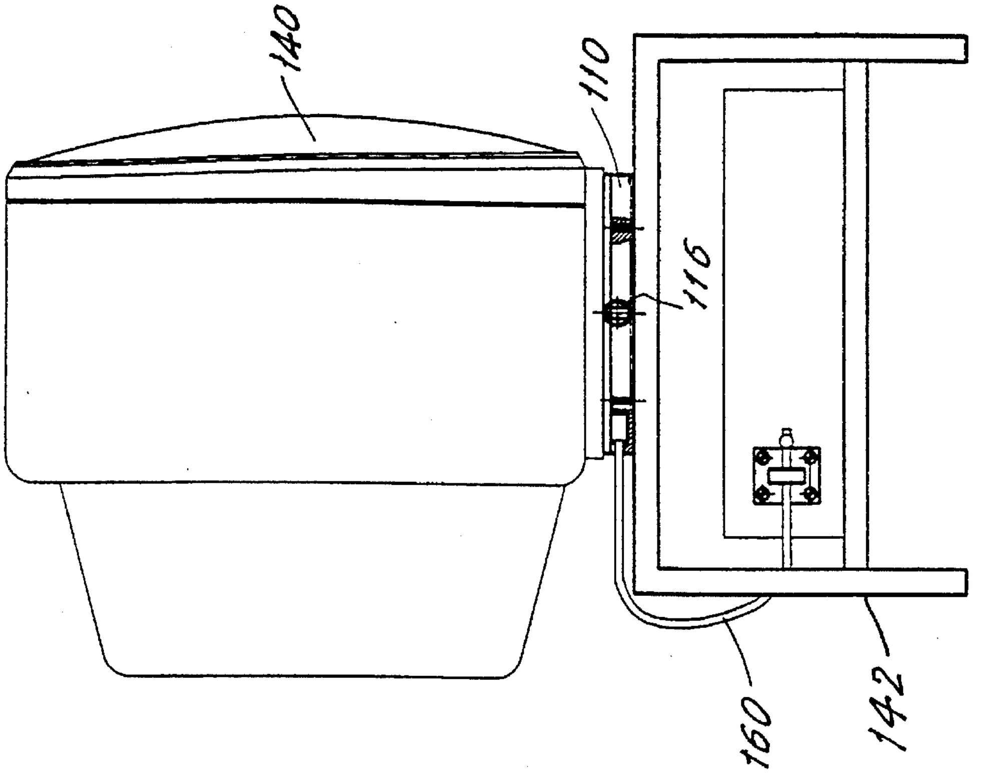
Figure 7E:
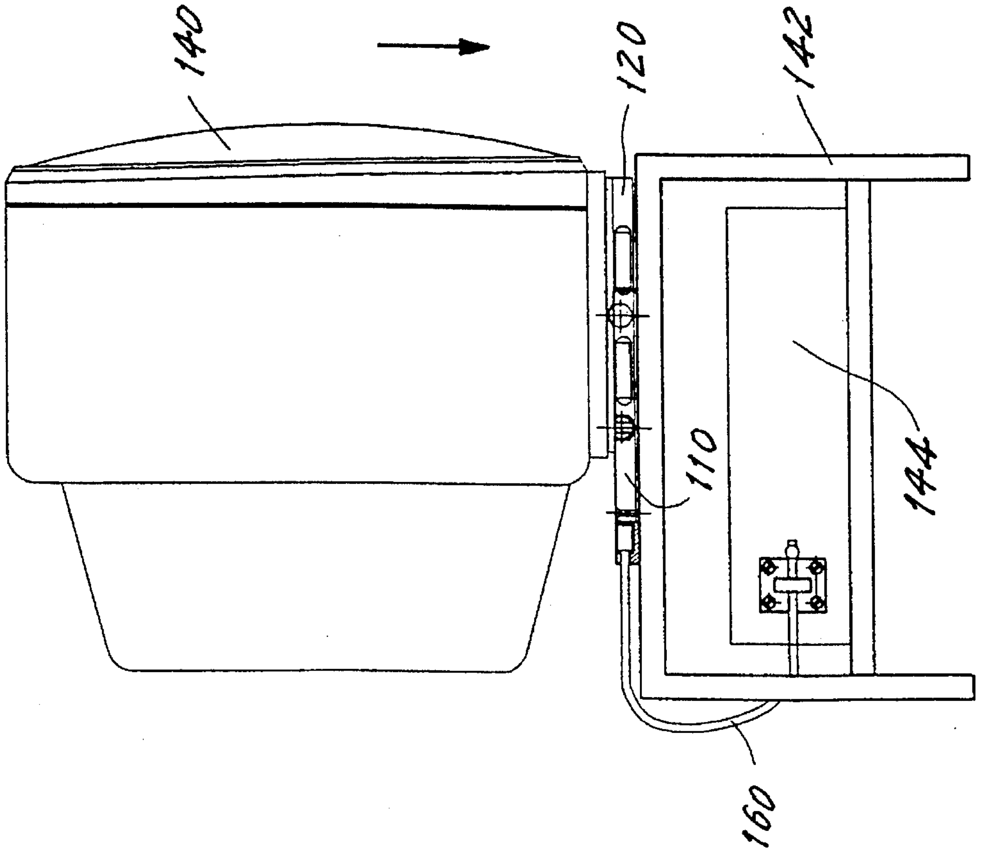
Figure 7G:
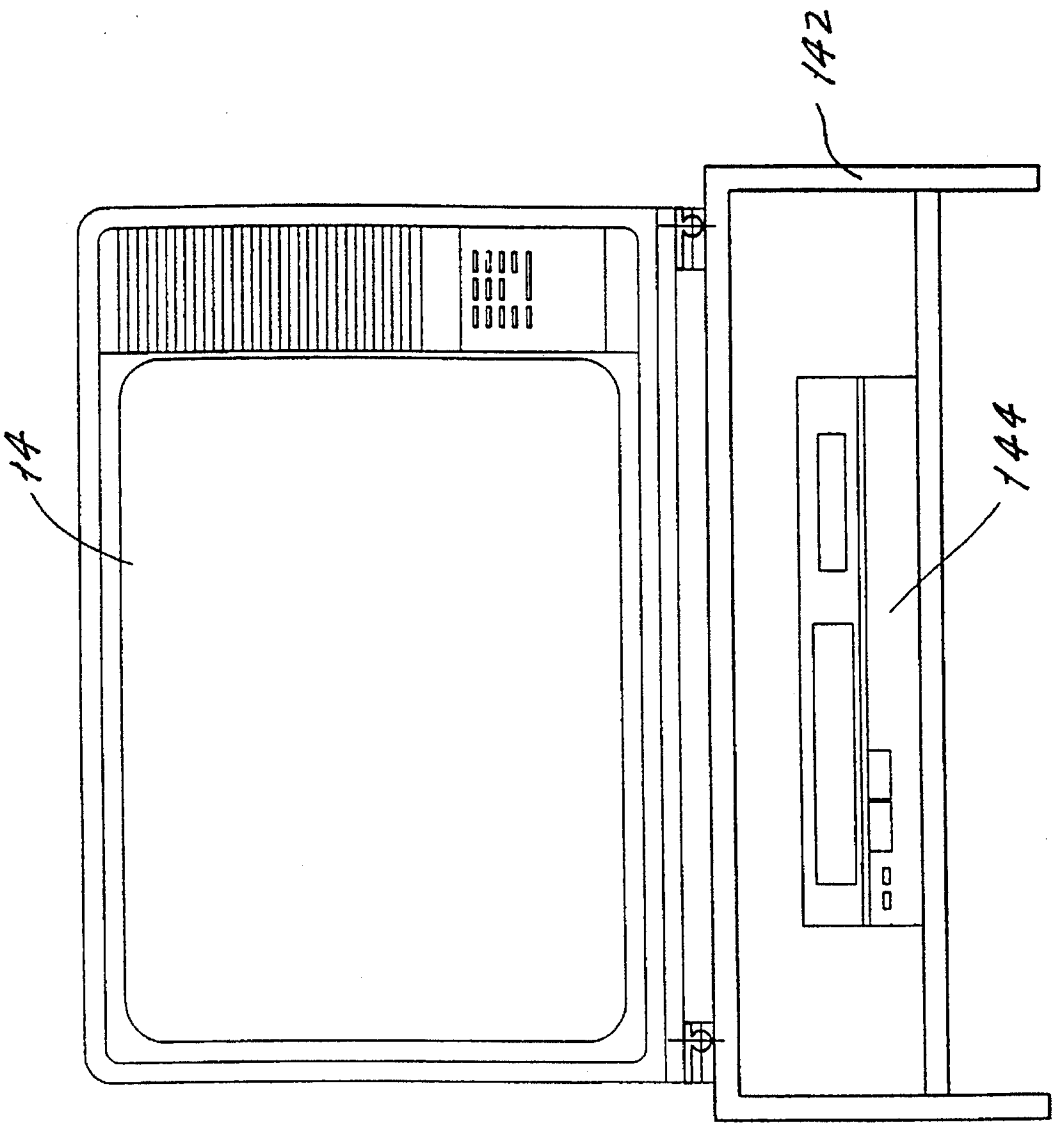
Figure 10:
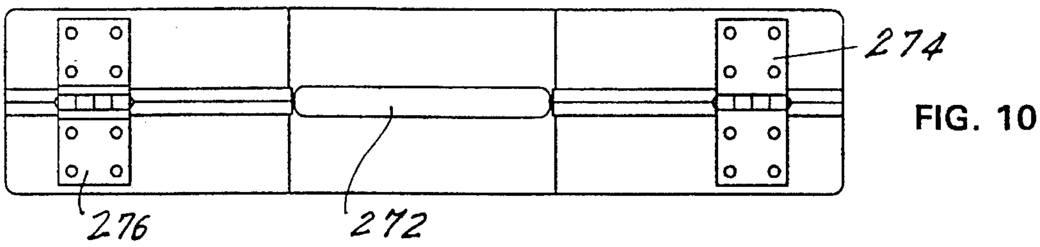
FIG. 10 is a top-view of the case of FIG. 8.

Hence, as shown in FIGS. 7*a* and 7*b*, TV set 140 has attached thereto (preferably by gluing according to a procedure that will be described later) a pair of male locking blocks 120 at its two sides, whereas table or other support 142 has secured thereto bottom locking members 110, e.g. by wood screws 134 (FIG. 7*c*). As further seen in FIGS. 7*c* and 7*d* the TV set 140 with its locking members 120 is hold above the bottom locking members 110, inserted thereinto (FIG. 7*e*) and slide to its final position (FIGS. 7*f* and 7*g*), then locked with an any suitable key operated locking unit 116.

For facilitating the mounting of the members 120 to the TV set, in accurate alignment with the members 110, the following technique is proposed. First, the members 110 are affixed to the table 142. The members 120 are then engaged in the ultimate matching position, namely interlocked with and overlapping the members 110.

A double-side sticking strip is applied to the top surface of the members 120, and the TV set placed thereon. It can then be disengaged, and the members 120 further secured by screws—if deemed necessary.

The removal and re-installing of the TV is thereafter performed whenever required in the fashion described above.

As already mentioned a cable arrangement may be provided for the combined securement of an additional portable unit, such as VCR set 144. To this end, a cable 60 is affixed to the VCR unit 144 (see FIG. 7*c*) by any means such as a plate 162 and screws 164. The cable 160 extends upwardly and terminated with a cap 166 configured to be accommodated within the recess 30 (see FIG. 1*a*). When now the members 110 and 120 are matched, the release of the cable is prevented and thereby securing the VCR unit against theft.

Reference shall now be made to the embodiment of the invention depicted in FIGS. 8–16, namely for the securement of an attache case by a locking device as heretofore disclosed.

Hence, it is frequently desirable to have ones brief-case, suitcase, etc., be safely anchored, e.g. to ones car or Office floor, or elsewhere.

Figure 8:
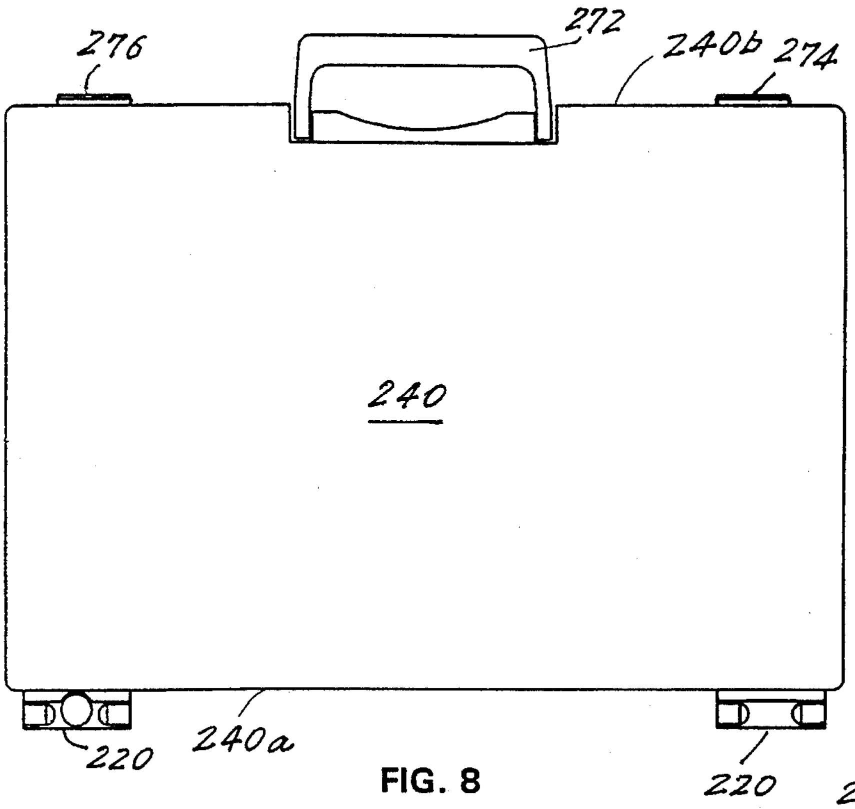
FIG. 8 shows an attache case provided with a securement arrangement designed according to the present invention.
Figure 9:
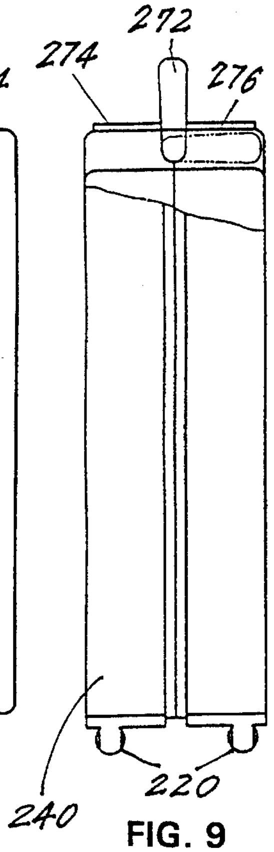
FIG. 9 is a side-view of the case of FIG. 8.
Figure 11:
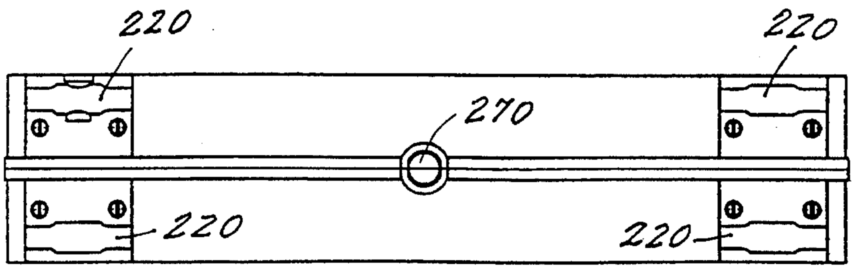
FIG. 11 is a bottom-view of the case of FIG. 8.
Figure 12:
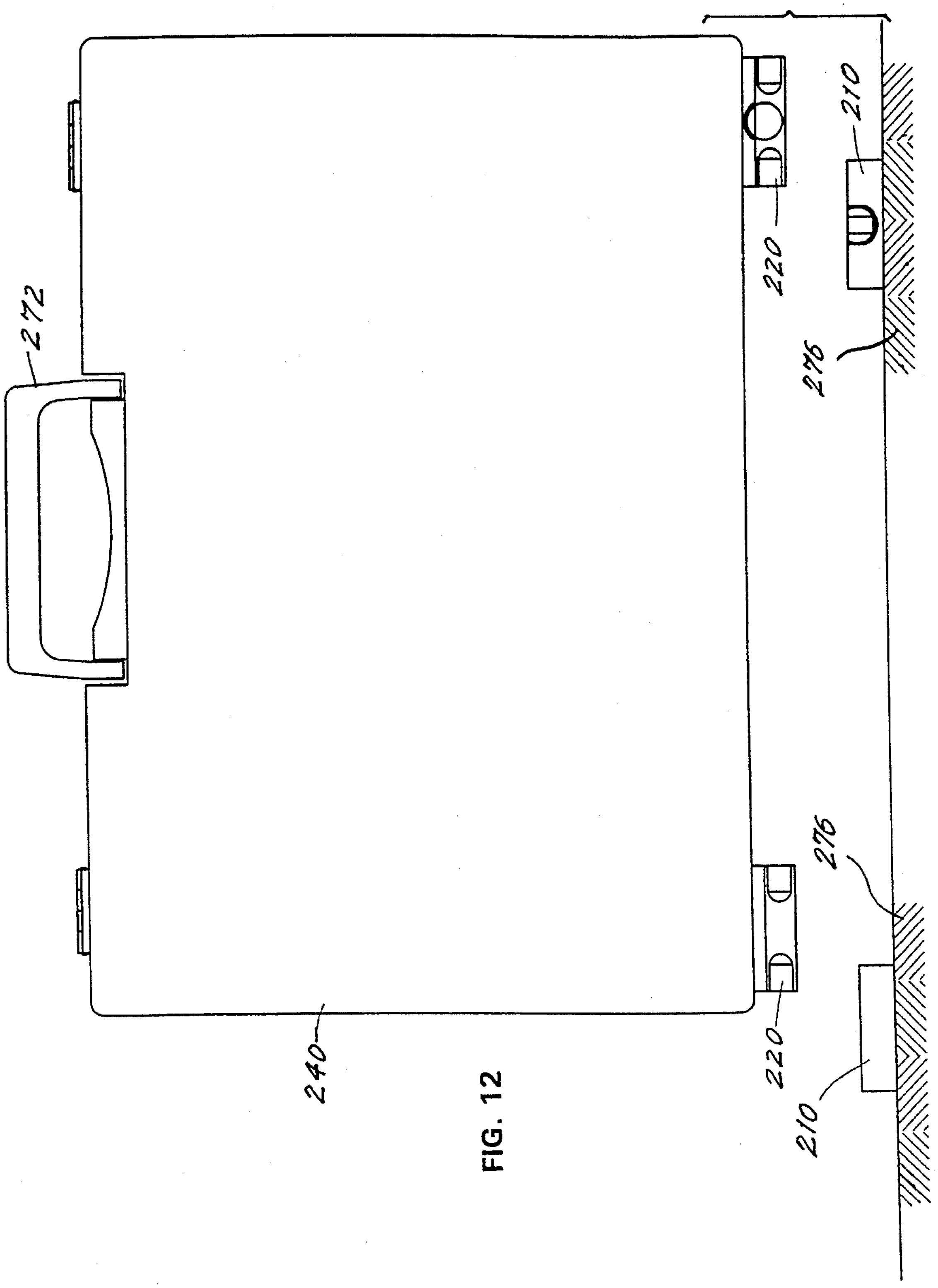
FIG. 12 is an elevation, illustrating a first stage of locking the case of FIG. 8 to a fixed surface.
Figure 13:
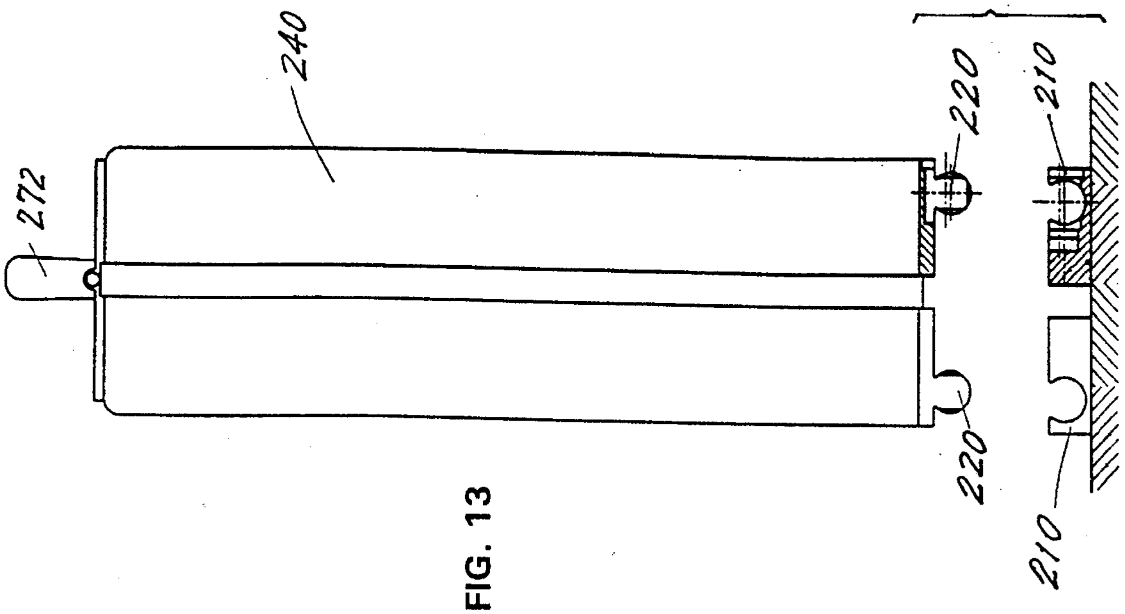
FIG. 13 is a side view corresponding to FIG. 12.
Figure 16:
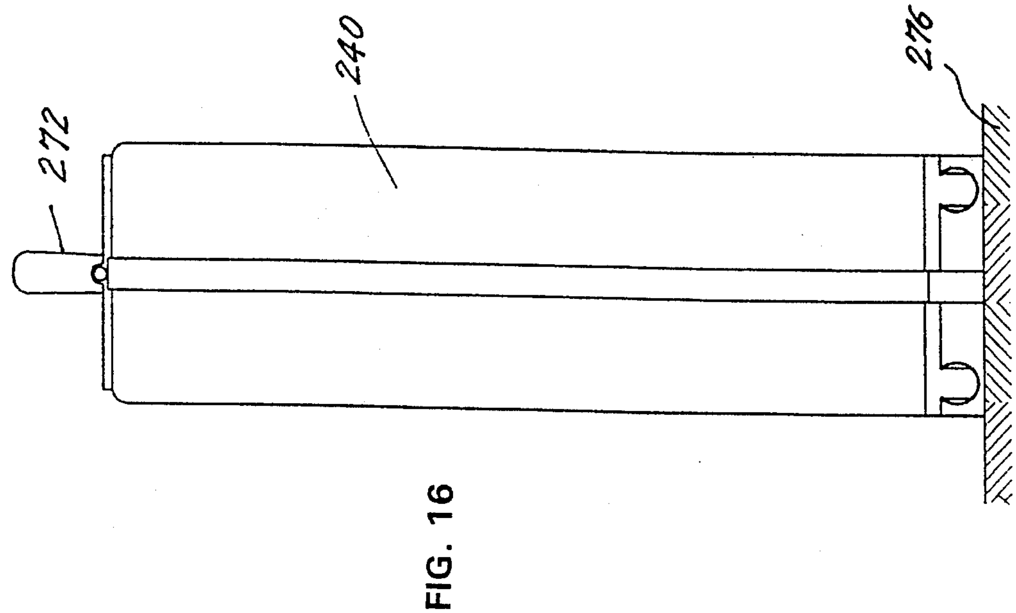
FIG. 16 is a side view of FIG. 15.
Figure 14:
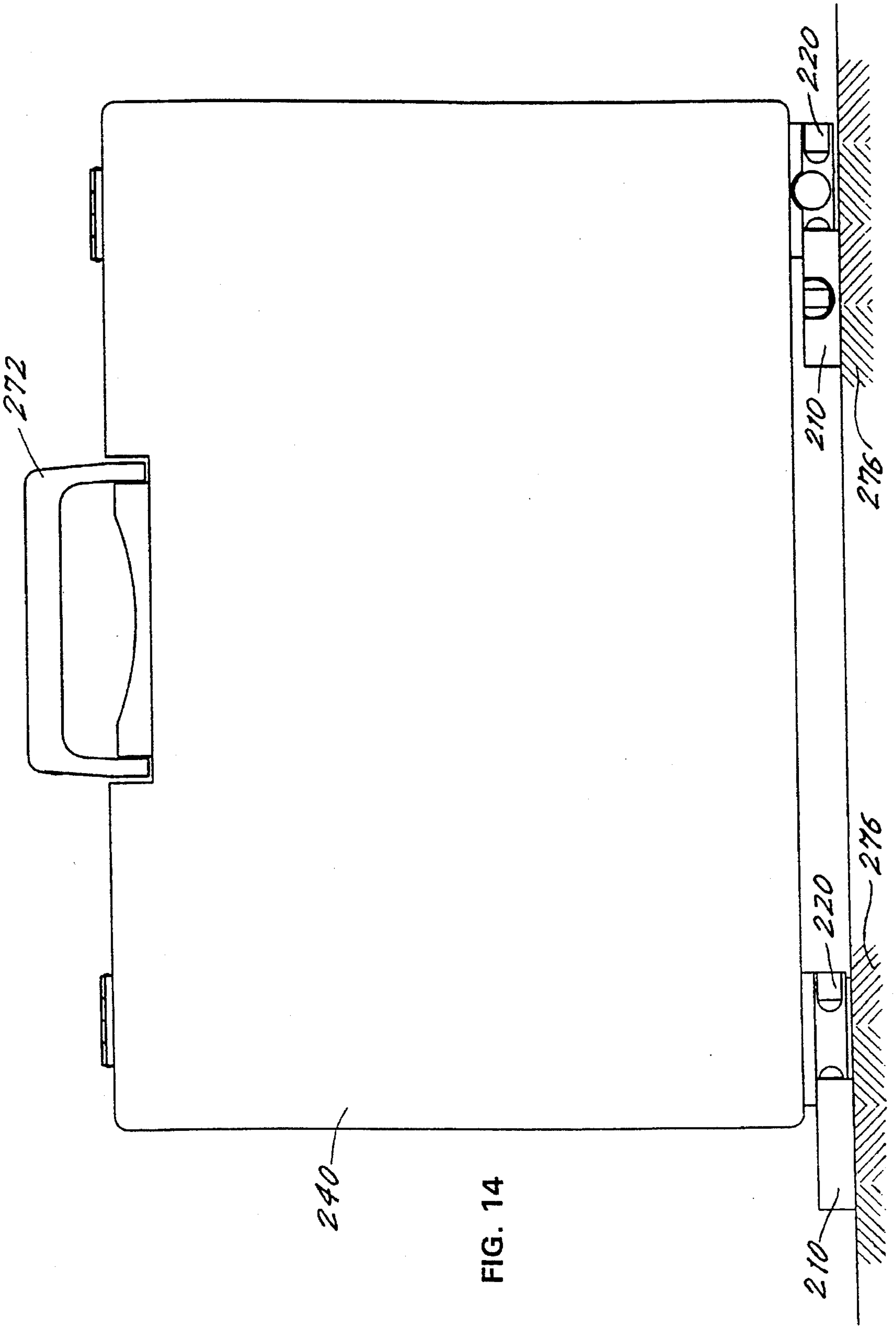
FIG. 14 illustrates a further step of locking the case of FIG. 12.
Figure 15:
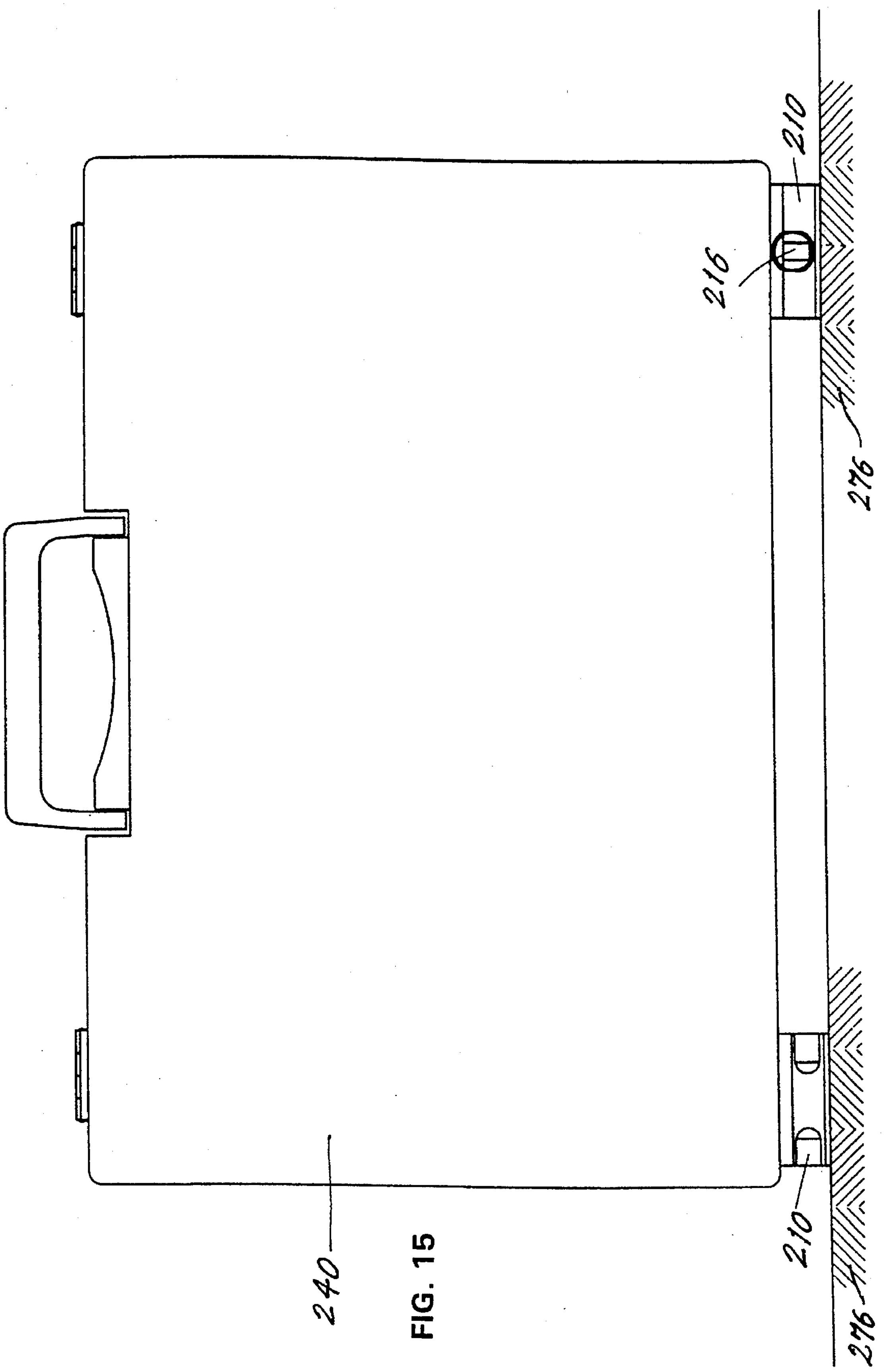
FIG. 15 shows the case of FIG. 14 in the locked position.

Attache case 240 of FIG. 8 thus comprises two pairs of male lock members 220, engageable in a similar manner as before described with respect to the locking device 10 of the preceding embodiment, to female, fixed members 210 (FIG. 12).

The members 220 are mounted to the bottom of the case 240, at its four corners; however, unlike conventional attache cases, case 240 is preferably openable from its bottom side 240*a*, which is provided with lock 270, whereas its handle 272 and pair of hinges 274, 276 are located at its top side 240*b*. In this manner, the block 270 is inaccessible and thus protected against tampering therewith.

It will be readily understood, in the light of the series of stage depicted in FIGS. 12–16 how the casing 240 is secured to the fixed surface 276, and locked by means of a key operated device 216 (FIG. 15) so that access to the lock 270 is blocked and the article as a whole is safely anchored.

Those skilled in the art will readily appreciated that various changes, modifications and variations of the invention as hereinbefore exemplified may be attained without departing from the scope of the invention as defined in and by the appended claims.

What is claimed is:

1. A locking device for connecting a portable object to a stationary object, the device comprising:

a first block member and a second block member which are slidable engageable along an axis;

the first block member being formed with a recess extending along the axis, the recess having a series of undercut portions and a series of non-undercut portions, arranged in staggered relationship to one another; and the second block member being formed with a projecting rib extending along the axis, the rib having a first series of portions which permit overlapping cooperation with the undercut portions, and a second series of portions which are freely insertable into and out of the undercut portions of the first member in a direction perpendicular to the axis, and the first and second portions of the second block member are arranged in a complementary staggered relationship to that of the undercut portions and the non-undercut portions of the first block member; and locking means for interlocking the block members to each other after the block members are slidably engaged.

2. The device as claimed in claim 1 wherein the undercut portions are of a circular profile.

3. The device as claimed in claim 2 wherein there are included in the first member three undercut portions and two non-undercut portions.

4. The device as claimed in claim 3 wherein the first member is adapted to be affixed to the stationary object, and the second member to the portable object.

5. The device as claimed in claim 4 wherein the first member is affixed by screws and the second member by glue.

6. The device as claimed in claim 5 wherein the first member is connected by a safety cable to a second portable object.

7. The device as claimed in claim 6 wherein the cable is secured to the locking device by its end being thickened and inserted into a cavity formed in the the first member before said interlocking of the members.

8. A locking device for connecting a portable object to a stationary object, the device comprising:

a first block member and a second block member which are slidable engageable along an axis;

the first block member being formed with a recess extending along the axis, the recess having a series of undercut portions and a series of non-undercut portions, arranged in staggered relationship to one another; and the second block member being formed with a projecting rib extending along the axis, the rib having a first series of portions which permit overlapping cooperation with the undercut portions, and a second series of portions which are freely insertable into and out of the undercut portions of the first member in a direction perpendicular to the axis, and the first and second portions of the second block member are arranged in a complementary staggered relationship to that of the undercut portions and the non-undercut portions of the first block member.

9. The device as claimed in claim 8, wherein the undercut portions are of a circular profile.

10. The device as claimed in claim 8, wherein there are included in the first member three undercut portions and two non-undercut portions.

11. The device as claimed in claim 8, wherein the first member is adapted to be affixed to the stationary object and the second member to the portable object.

12. The device as claimed in claim 11, wherein the first member is affixed by screws and the second member by glue.

13. The device as claimed in claim 8, wherein the first member is connected by a safety cable to a second portable object.

14. The device as claimed in claim 13, wherein the cable is secured to the locking device by its end being thickened and inserted into a cavity formed in the first member before the interlocking of the members.

* * * * *